United States Patent
Hara et al.

(10) Patent No.: US 11,646,690 B2
(45) Date of Patent: May 9, 2023

(54) MOTOR CONTROL DEVICE AND ELECTRIC VEHICLE SYSTEM

(71) Applicant: HITACHI ASTEMO, LTD., Hitachinaka (JP)

(72) Inventors: Takafumi Hara, Tokyo (JP); Midori Takaoka, Tokyo (JP); Toshiyuki Ajima, Tokyo (JP); Hirokazu Matsui, Hitachinaka (JP); Akihiro Ashida, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 206 days.

(21) Appl. No.: 17/282,453

(22) PCT Filed: Sep. 12, 2019

(86) PCT No.: PCT/JP2019/035827
§ 371 (c)(1),
(2) Date: Apr. 2, 2021

(87) PCT Pub. No.: WO2020/071081
PCT Pub. Date: Apr. 9, 2020

(65) Prior Publication Data
US 2021/0384859 A1     Dec. 9, 2021

(30) Foreign Application Priority Data
Oct. 3, 2018   (JP) .............................. JP2018-188617

(51) Int. Cl.
*H02P 1/30*     (2006.01)
*H02P 27/08*    (2006.01)
(Continued)

(52) U.S. Cl.
CPC ............ *H02P 27/085* (2013.01); *B60L 15/20* (2013.01); *B60K 6/485* (2013.01); *B60Y 2200/91* (2013.01); *B60Y 2200/92* (2013.01)

(58) Field of Classification Search
CPC ........ H02P 27/085; H02P 27/08; H02P 29/40; H02P 6/08; B60L 15/20; B60Y 2200/91
See application file for complete search history.

(56) References Cited

U.S. PATENT DOCUMENTS

2009/0129132 A1   5/2009   Furutani
2012/0286716 A1   11/2012  Ohsugi
(Continued)

FOREIGN PATENT DOCUMENTS

EP   0732798 A1    9/1996
JP   H08-251930 A  9/1996
(Continued)

OTHER PUBLICATIONS

International Search Report with English translation and Written Opinion issued in corresponding application No. PCT/JP2019/035827 dated Dec. 17, 2019.

*Primary Examiner* — Karen Masih
(74) *Attorney, Agent, or Firm* — Foley & Lardner LLP

(57) ABSTRACT

A random value integration unit 175 outputs a random value output from a random value generation unit 174 in a diffusion width Rand output from a diffusion width generation unit 173 by a product of an output of the random value generation unit 174 and an output of the diffusion width generation unit 173. A triangular wave signal generation unit 176 generates a triangular wave signal corresponding to a second carrier frequency fc2 which is obtained by adding the random value output from the random value integration unit 175 to a first carrier frequency fc1 which is an output of a carrier frequency setting unit 171. That is, a frequency obtained by increasing the diffusion width of the first carrier (Continued)

frequency fc1 is used as the second carrier frequency fc2, and the second carrier frequency is used as the carrier frequency.

18 Claims, 16 Drawing Sheets

(51) Int. Cl.
  *B60L 15/20* (2006.01)
  *B60K 6/485* (2007.10)

(56) References Cited

U.S. PATENT DOCUMENTS

| | | |
|---|---|---|
| 2013/0169206 A1 | 7/2013 | Suhama |
| 2018/0191288 A1 | 7/2018 | Li |
| 2019/0366854 A1* | 12/2019 | Sun .................... B60L 15/08 |

FOREIGN PATENT DOCUMENTS

| | | |
|---|---|---|
| JP | 2017-017817 A | 1/2017 |
| WO | WO-2007/144959 A1 | 12/2007 |
| WO | WO-2011/096051 A1 | 8/2011 |
| WO | WO-2011/155013 A1 | 12/2011 |

* cited by examiner (A)

(C)

(B)

(D)

(A)

(B)

(C)

(D)

(A)

(B)

(C)

(D)

(E)

(F)

MOTOR CONTROL DEVICE AND ELECTRIC VEHICLE SYSTEM

TECHNICAL FIELD

The present invention relates to a motor control device and an electric vehicle system.

BACKGROUND ART

Generally, a motor control device including an inverter that converts a DC voltage into any frequency and voltage is used in order to drive a motor. The motor control device controls the voltage and frequency applied to the motor by performing pulse width modulation control (PWM control) of a switching element constituting the inverter, and thus, the motor is driven at a variable speed.

In recent years, as high-speed switching elements such as a SiC semiconductor and a GaN semiconductor become widespread, a carrier frequency of the inverter tends to increase. On the other hand, when a rotation speed of the motor increases and a ratio of the carrier frequency to the electric angular frequency of the motor becomes small, a low-frequency beat current is generated.

PTL 1 described that a current beat component is reduced by estimating a frequency, a phase, and an amplitude of the current beat component in an output current of an inverter by phase locked loop (PLL) processing and correcting a voltage command to the inverter based on the estimated frequency, phase, and amplitude.

CITATION LIST

Patent Literature

PTL 1: JP 2017-17817 A

SUMMARY OF INVENTION

Technical Problem

The technology described in PTL 1 cannot suppress the beat current generated when the ratio of the carrier frequency to the electric angular frequency of the motor becomes small.

Solution to Problem

A motor control device according to the present invention is a motor control device including an inverter that converts a DC voltage into a three-phase AC voltage, and drives a motor, and a control unit that outputs a PWM signal to the inverter based on a carrier frequency. When a ratio of a preset first carrier frequency to an electric angular frequency of the motor is equal to or less than a first predetermined value, the control unit randomly changes the carrier frequency around the first carrier frequency.

A motor control device according to the present invention is a motor control device including an inverter that converts a DC voltage into a three-phase AC voltage, and drives a motor, and a control unit that outputs a PWM signal to the inverter based on a carrier frequency. When a ratio of a preset first carrier to an electric angular frequency of the motor is equal to or less than a first predetermined value and a ratio of the AC voltage to the DC voltage is equal to or greater than a second predetermined value, the control unit randomly changes the carrier frequency around the first carrier frequency.

An electric vehicle system according to the present invention includes a motor control device, and a motor controlled to be driven by the motor control device.

Advantageous Effects of Invention

According to the present invention, it is possible to suppress the beat current generated when the ratio of the carrier frequency to the electric angular frequency of the motor becomes small.

DESCRIPTION OF EMBODIMENTS

First Embodiment

Figure 1:
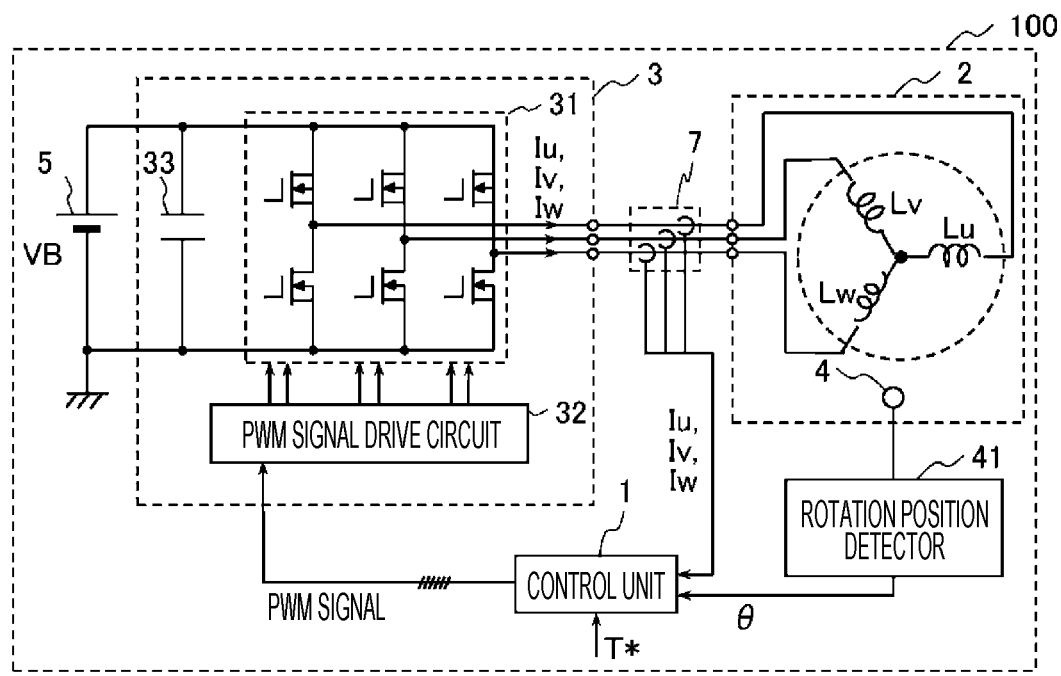
FIG. 1 is a block configuration diagram of a motor control device.

Hereinafter, a first embodiment will be described with reference to FIGS. 1 to 7.
FIG. 1 is a block configuration diagram of a motor control device 100 according to the present embodiment. The motor control device 100 includes a control unit 1, a motor 2, and an inverter 3.

A torque command T* is input to the control unit 1 from an external control device. A rotation position θ is input from a rotation position sensor 4 of the motor 2 via a rotation position detector 41. A U-phase alternating current Iu, a V-phase alternating current Iv, and a W-phase alternating current Iw which are three-phase alternating currents are input from a current detection circuit 7. The control unit 1 generates and outputs PWM signals based on these values.

The motor 2 is a three-phase synchronous motor that is rotationally driven by supplying a three-phase AC voltage. The rotation position sensor 4 is attached to the motor 2 in order to control a phase of a three-phase AC applied voltage according to a phase of an induced voltage of the motor 2. A signal of the rotation position sensor 4 is input to the rotation position detector 41, the rotation position θ is detected by the rotation position detector 41, and the rotation position θ is input to the control unit 1. Here, a resolver including an iron core and a winding is more suitable for the rotation position sensor 4, but a magnetoresistive element such as a GMR sensor or a sensor using a Hall element may be used. The rotation position θ may be estimated by using a three-phase current or a three-phase voltage of the motor 2.

The inverter 3 includes an inverter circuit 31, a PWM signal drive circuit 32, and a smoothing capacitor 33. The inverter circuit 31 converts a DC voltage and an AC voltage to each other by using a switching element. The PWM signal drive circuit 32 drives the switching element by outputting PWM signals to the inverter circuit 31. The smoothing capacitor 33 smooths a DC power.

A high voltage battery 5 is a DC voltage source of the motor control device 100. A DC voltage VB of the high voltage battery 5 is converted into a variable voltage and a pulsed three-phase AC voltage having a variable-frequency by the inverter 3, and the converted AC voltage is applied to the motor 2.

The current detection circuit 7 detects the U-phase alternating current Iu, the V-phase alternating current Iv, and the W-phase alternating current Iw which are the three-phase alternating currents that energize the motor 2. Here, although an example in which three current detectors are provided is illustrated, the two current detectors may be used, and the remaining one phase may be calculated from the fact that a sum of the three-phase currents is zero. A pulsed DC bus current flowing into the inverter 3 is detected as a voltage at both ends of a shunt resistor Rsh inserted between the smoothing capacitor 33 and the inverter 3 (current detection value Idc), and the DC current may be reproduced as three-phase currents according to the applied voltage.

Figure 2:
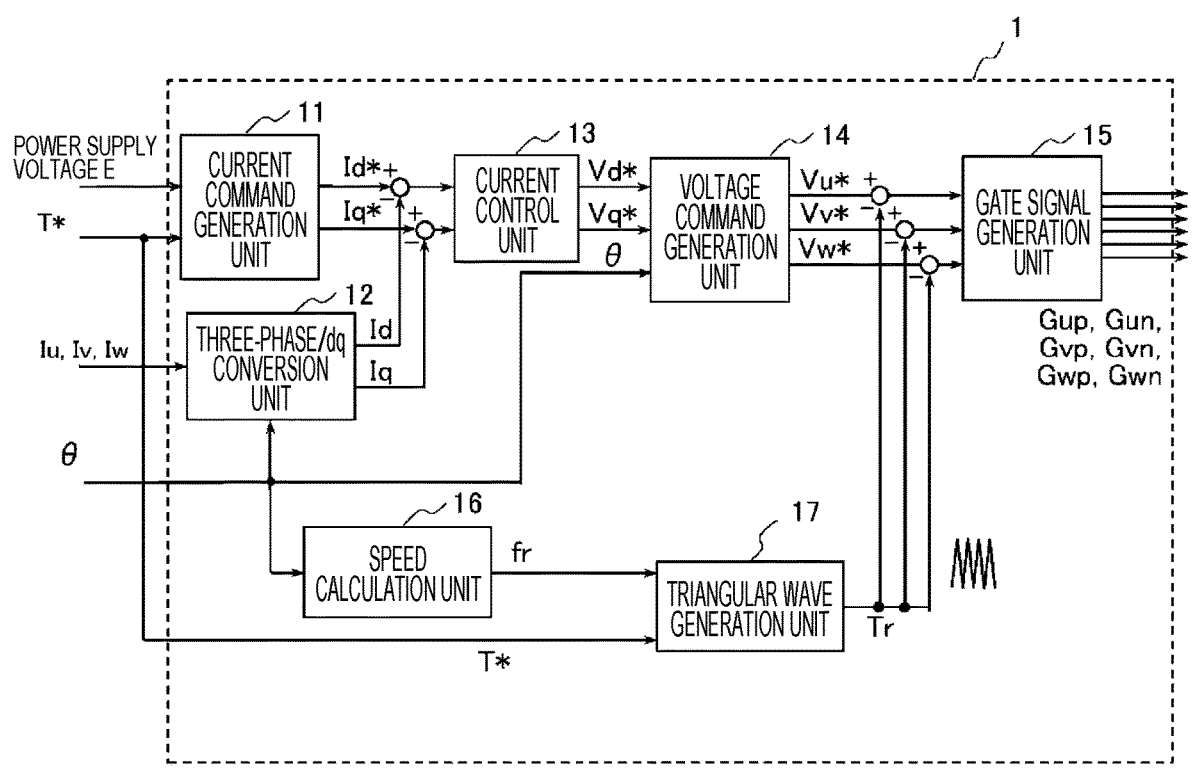
FIG. 2 is a configuration diagram of a control unit.

FIG. 2 is a configuration diagram of the control unit 1.

As illustrated in FIG. 2, the control unit 1 includes a current command generation unit 11, a three-phase/dq conversion unit 12, a current control unit 13, a voltage command generation unit 14, a gate signal generation unit 15, a speed calculation unit 16, and a triangular wave generation unit 17. The control unit 1 outputs three-phase voltage command values obtained by UVW conversion so as to correspond to the detected U-phase alternating current Iu, V-phase alternating current iv, and W-phase alternating current Iw, and the input torque command T*, and drives the inverter circuit 31 of the inverter 3.

The current command generation unit 11 decides a d-axis current command Id* and a q-axis current command Iq* by using a relational expression or map of a motor torque between a d-axis current value Id and a q-axis current value Iq based on the torque command T* and a power supply voltage E.

The three-phase/dq conversion unit 12 calculates the d-axis current value Id and the q-axis current value Iq obtained by dq conversion from the U-phase alternating current Iu, the V-phase alternating current iv, the W-phase alternating current Iw, and the rotation position θ.

The current control unit 13 calculates a d-axis voltage command Vd* and a q-axis voltage command Vq* such that the d-axis current value Id and the q-axis current value Iq coincide with the d-axis current command Id* and the q-axis current command Iq* created according to a target torque, respectively.

The voltage command generation unit 14 calculates a U-phase voltage command value Vu*, a V-phase voltage command value Vv, and a UW-phase voltage command value Vw* which are three-phase voltage command values obtained by UVW conversion from the d-axis voltage command Vd*, the q-axis voltage command Vq*, and the rotation position θ, and outputs PWM signals obtained by pulse width modulation of the three-phase voltage command values.

The speed calculation unit 16 calculates a motor rotation frequency fr from a temporal change of the rotation position θ, and outputs the motor rotation frequency to the triangular wave generation unit 17. The triangular wave generation unit 17 generates a triangular wave signal (carrier signal) Tr having a predetermined carrier frequency based on the motor rotation frequency fr and the torque command T* of the motor 2.

The gate signal generation unit 15 compares the U-phase voltage command value Vu*, the V-phase voltage command value Vv*, the W-phase voltage command value Vw* which are outputs of the voltage command generation unit 14 with the triangular wave signal Tr having the predetermined carrier frequency which is an output of the triangular wave generation unit 17, and generates a pulsed voltage. That is, gate signals Gup, Gvp, and Gwp of an upper arm of the inverter circuit 31 and gate signals Gun, Gvn, and Gwn of a lower arm of the inverter circuit 31 are generated. These gate signals are output, as the PWM signals, to the inverter 3.

Figure 3:
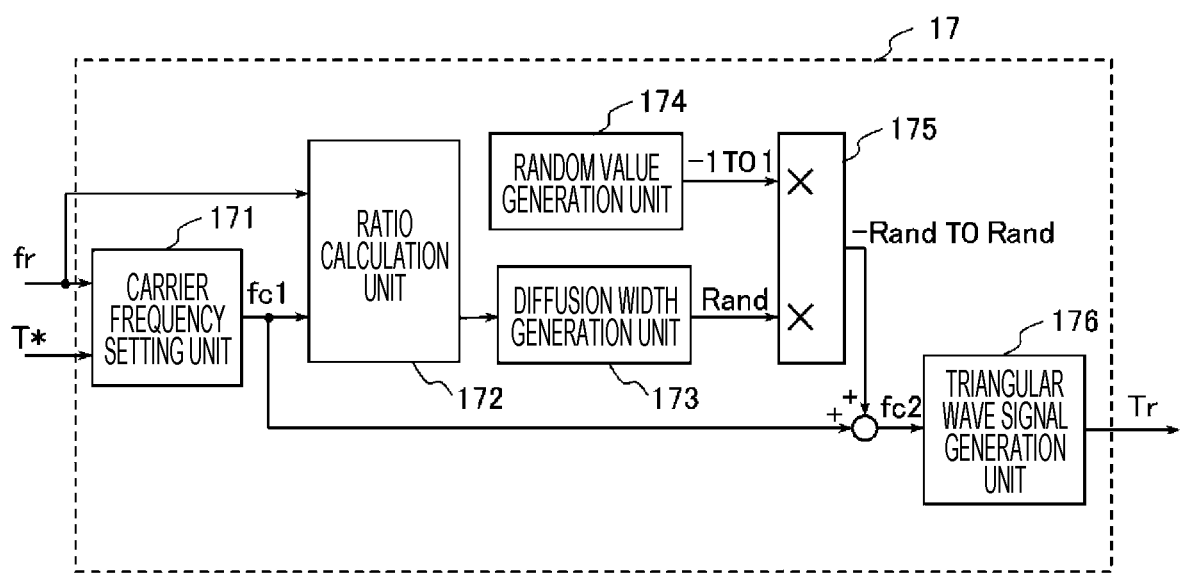
FIG. 3 is a configuration diagram of a triangular wave generation unit.

FIG. 3 is a configuration diagram of the triangular wave generation unit 17.

The triangular wave generation unit 17 includes a carrier frequency setting unit 171, a ratio calculation unit 172, a diffusion width generation unit 173, a random value generation unit 174, a random value integration unit 175, and a triangular wave signal generation unit 176.

The carrier frequency setting unit 171 generates a first carrier frequency fc1 based on the motor rotation frequency fr which is an output of the speed calculation unit 16 and the torque command T* of the motor 2. The first carrier frequency is set to protect against destruction due to heat generation of the inverter, avoid electrical resonance generated by a wiring and a capacitor, and avoid deterioration of vibration and noise due to mechanical resonance of the motor 2, the inverter 3, or the like.

The ratio calculation unit 172 obtains a ratio by performing calculation by a mathematical expression illustrated in Equation (1). That is, the electric angular frequency f1 of the motor 2 is obtained by dividing the motor rotation frequency fr which is the output of the speed calculation unit 16 by the number of pole pairs p of the motor 2, and the first carrier frequency fc1 is divided by the electric angular frequency f1.

ratio=(first carrier frequency $fc1$)/($fr/p$)=(first carrier frequency $fc1$)/($f1$)   (1)

Figure 4:
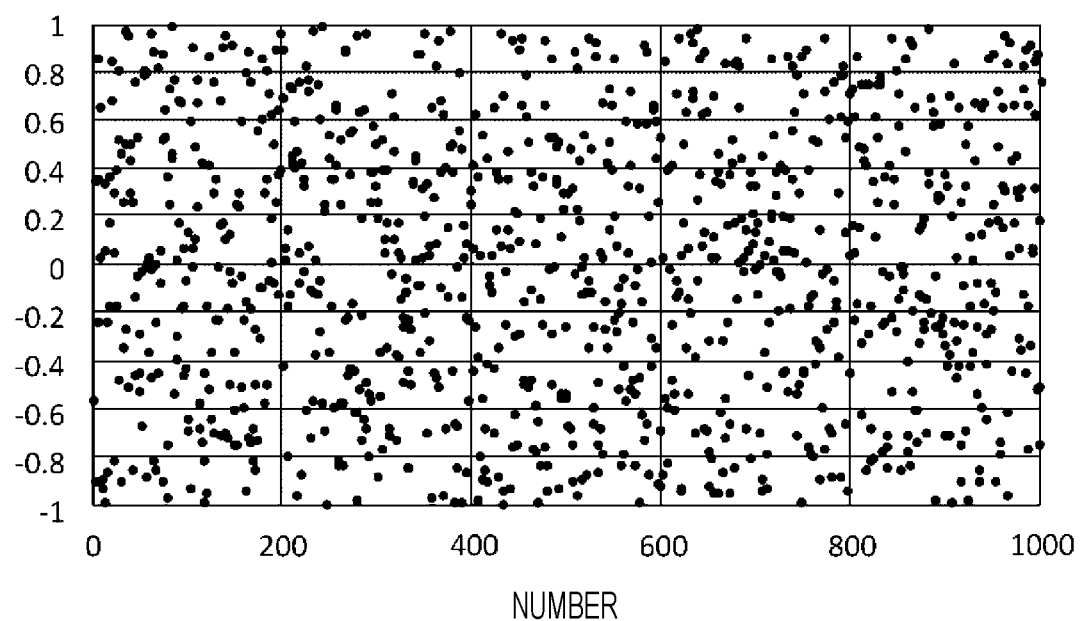
FIG. 4 is a diagram illustrating an output example of a random value generation unit.
Figure 5:
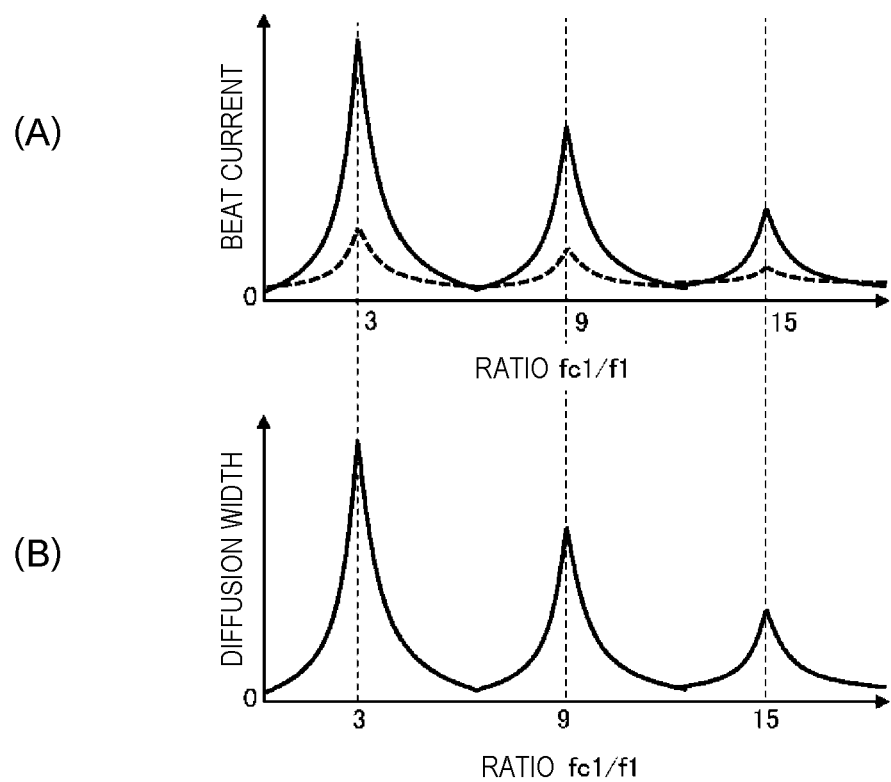
FIG. 5(A) is a diagram illustrating a relationship between a ratio of a carrier frequency to an electric angular frequency of a motor and a beat current.
FIG. 5(B) is a diagram illustrating a relationship between the ratio of the carrier frequency to the electric angular frequency of the motor and a diffusion width.

The random value generation unit 174 outputs a random value for a predetermined time. FIG. 4 is a diagram illustrating an output example of the random value generation unit 174. As illustrated in FIG. 4, 1000 random values are repeatedly output for each predetermined time between a maximum value 1 and a minimum value −1 based on a random table. The random table illustrated in FIG. 4 may be stored in a memory of a microcomputer and the value may be output while referring to the random table. The value may be output randomly based on a calculation expression of a specific random function. The random function may be a constant calculation or a map calculation.

The diffusion width generation unit 173 increases a diffusion width Rand to be described below as the ratio input from a ratio calculation unit 172, that is, a ratio of the first carrier frequency fc1 to the electric angular frequency f1 of the motor 2 becomes closer to first constants 3, 9, and 15.

The random value integration unit 175 outputs a value that changes randomly in the diffusion width Rand output from the diffusion width generation unit 173 by the product of the output of the random value generation unit 174 and the output of the diffusion width generation unit 173.

The triangular wave signal generation unit 176 generates a triangular wave signal corresponding to a second carrier frequency fc2 which is obtained by adding the random value output from the random value integration unit 175 to the first carrier frequency fc1 which is the output of the carrier frequency setting unit 171. Although an example in which the triangular wave signal is used is described in the present embodiment, the same can be true of a case where a sawtooth wave is used.

Next, beat voltage and current will be described. In the present embodiment, a case where a DC voltage utilization factor obtained by dividing an effective value of a line voltage of each phase of the motor 2 by a DC voltage is 0.707 or less (modulation rate is 1.15 or less) is used as a target. At this time, when the ratio of the first carrier frequency fc1 to the electric angular frequency f1 of the motor 2 is smaller than 20, the beat voltage and the beat current are likely to be generated, and the beat voltage and current increase sharply when the ratio of the first carrier frequency fc1 to the electric angular frequency f1 of the motor 2 becomes close to 3*(2*n−1) (n is a natural number).

FIG. 5(A) is a diagram illustrating a relationship between the ratio of the first carrier frequency fc1 and the electric angular frequency f1 of the motor 2 and the beat current. A horizontal axis represents the ratio, and a vertical axis represents the beat current. As illustrated by a solid line in FIG. 5(A), the beat current becomes large when the ratio is 3, 9, and 15. A dotted line in FIG. 5(A) is an example of a case where the present embodiment is applied, and the beat current can be suppressed.

FIG. 5(B) is a diagram illustrating a relationship between the ratio of the first carrier frequency fc1 to the electric angular frequency f1 of the motor 2 and the diffusion width. A horizontal axis represents the ratio, and a vertical axis represents the diffusion width. The diffusion width illustrated in FIG. 5(B) is a magnitude of the diffusion width output from the diffusion width generation unit 173. As illustrated in FIG. 5(B), in the present embodiment, the beat current can be suppressed as illustrated by the dotted line in FIG. 5(A) by increasing the diffusion width when the ratio is 3, 9, and 15. That is, in the present embodiment, when the ratio of the first carrier frequency fc1 to the electric angular frequency f1 of the motor 2 approaches the first constants 3, 9, and 15, the diffusion width generation unit 173 increases the diffusion width as illustrated in FIG. 5(B) in inverse proportion to an absolute value of a difference between the ratio and the first constant.

Figure 6:
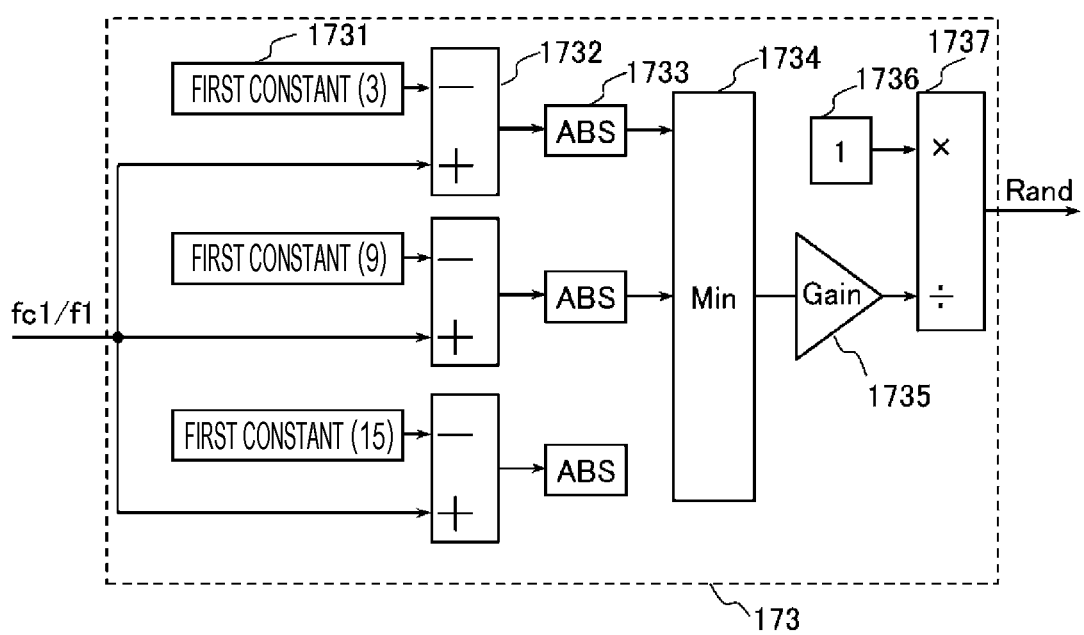
FIG. 6 is a configuration diagram of a diffusion width generation unit.

FIG. 6 is a detailed configuration diagram of the diffusion width generation unit 173.

As illustrated in FIG. 6, three first constant storage units 1731 store the three constants 3, 9, and 15, which are the first constants, respectively. Each of three addition and subtraction units 1732 adds or subtracts each constant to or from the ratio of the first carrier frequency fc1 to the electric angular frequency f1 of the motor 2. The addition and subtraction results are input to a minimum value output unit 1734 via absolute value output unit 1733, respectively. The minimum value output unit 1734 outputs a value with the smallest difference between each constant and the ratio. This value is multiplied by a gain in a proportional unit 1735, and a reciprocal of 1 which is an output of a constant value output unit 1736 is used in a multiplication and division unit 1737. Accordingly, the diffusion width in inverse proportion to the absolute value of the difference between the first constant and the ratio of the first carrier frequency fc1 to the electric angular frequency f1 of the motor 2 is set. The gain of the proportional unit 1735 may be decided to reduce the beat current by numerical analysis, or may be decided such that a maximum effect can be obtained by experiment.

Figure 7:
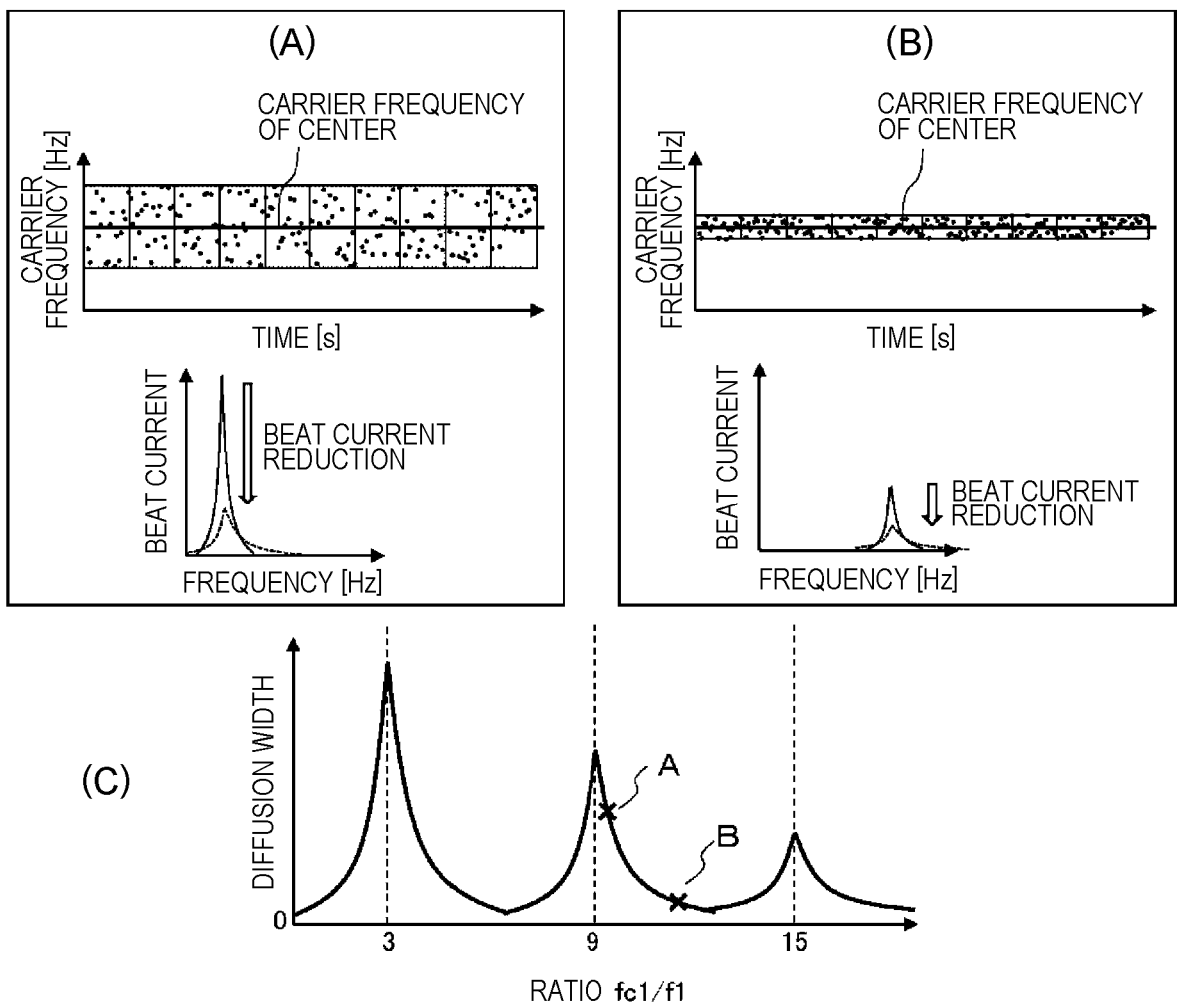
FIGS. 7(A) and 7(B) are diagrams illustrating diffusion of a carrier frequency.

FIG. 7 is a diagram illustrating the diffusion of the carrier frequency. FIG. 7(C) is the same diagram as FIG. 5(B). That is, FIG. 7(C) is a diagram illustrating a relationship between the ratio of the first carrier frequency fc1 to the electric angular frequency f1 of the motor 2 and the diffusion width. A horizontal axis represents the ratio, and a vertical axis represents the diffusion width. A state of the carrier frequency and the beat current at a point A in FIG. 7(C) is illustrated in FIG. 7(A). A state of the carrier frequency and the beat current at a point B in FIG. 7(C) is illustrated in FIG. 7(B).

As illustrated in FIG. 7(C), at the point A, the ratio of the first carrier frequency fc1 to the electric angular frequency f1 of the motor 2 is close to 9 which is one of the first constants. At this time, as illustrated by a solid line in the lower figure of FIG. 7(A), the frequency of the beat current is near 0 Hz. Thus, an effect of reducing a current ripple due to an inductance is not obtained, and the beat current increases. In the present embodiment, as illustrated in the upper figure of FIG. 7(A), the diffusion width is increased around the first carrier frequency fc1 and a value of the carrier frequency is widely changed before and after the first carrier frequency fc1. Accordingly, as illustrated by a dotted line in the figure below FIG. 7(A), the frequency of the beat current can be diffused and the beat current can be reduced. That is, a frequency obtained by increasing the diffusion width of the first carrier frequency fc1 is used as the second carrier frequency fc2, and the second carrier frequency is used as the carrier frequency of the inverter 3.

On the other hand, as illustrated in FIG. 7(C), at the point B, the ratio of the first carrier frequency fc1 to the electric angular frequency f1 of the motor 2 is far from 9 which is one of the first constants. At this time, as illustrated by a solid line in the lower figure of FIG. 7(B), the frequency of the beat current is far from 0 Hz. Thus, the effect of reducing the current ripple due to the inductance can be obtained, and the beat current is reduced even though the diffusion width is smaller than the diffusion width when the ratio of the first carrier frequency fc1 to the electric angular frequency f1 of the motor 2 is close to the first constant. In the present embodiment, as illustrated in the upper figure of FIG. 7(B), the diffusion width of the first carrier frequency fc1 is slightly increased. Accordingly, as illustrated by a dotted line in the figure below FIG. 7(B), the frequency of the beat current caused by a voltage error of one cycle of a sine wave that generates a beat can be diffused. Accordingly, the beat current is dispersed in the entire speed range of the motor 2, and thus, controllability is improved. Therefore, low-frequency electromagnetic noise can be reduced.

The diffusion width is continuously changed depending on the ratio of the first carrier frequency fc1 to the electric angular frequency f1 of the motor 2 when the ratio is 20 or less, and thus, the second carrier frequency fc2 is randomly changed around the first carrier frequency fc1. Accordingly, the continuity of an amplitude of the beat current can be ensured when a rotation speed of the motor 2 is continuously changed.

The motor control device 100 may be a motor drive system in which the motor 2 and the inverter 3 are integrated, or may be a system in which the motor 2 and the inverter 3 are separated.

Second Embodiment

A second embodiment will be described with reference to FIGS. 8 to 15. Since a block configuration diagram of a motor control device 100 in the present embodiment is the same as that of FIG. 1 illustrated in the first embodiment, the illustration and description will be omitted. A configuration diagram of the control unit 1 in the present embodiment is the same as that of FIG. 2 illustrated in the first embodiment except for the configuration of the triangular wave generation unit 17. In the present embodiment, this different part will be mainly described.

Figure 8:
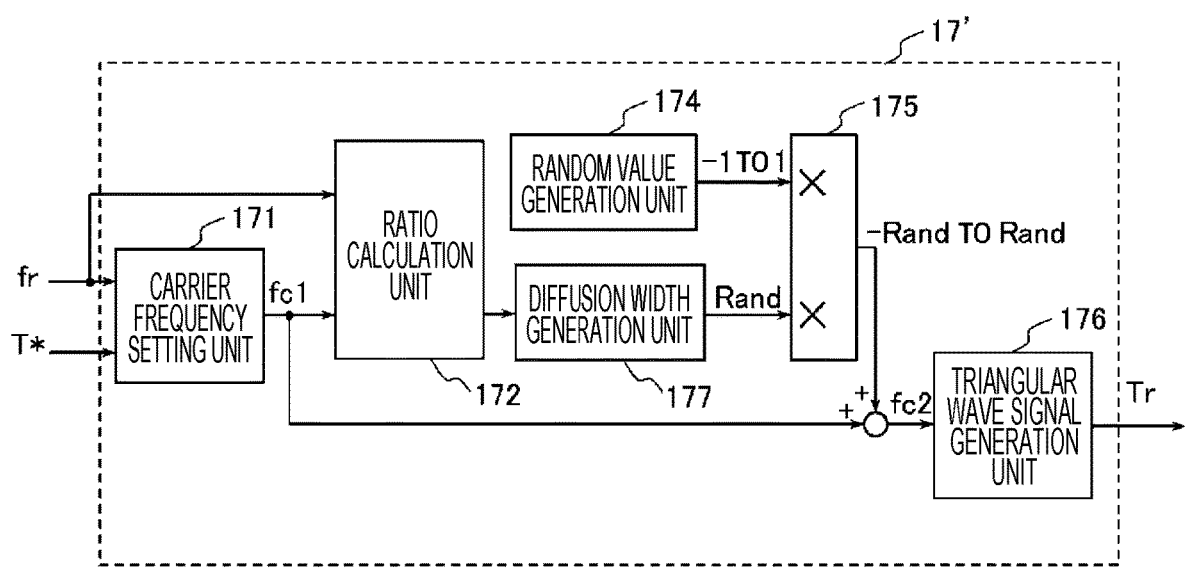
FIG. 8 is a configuration diagram of a triangular wave generation unit in a second embodiment.
Figure 9:
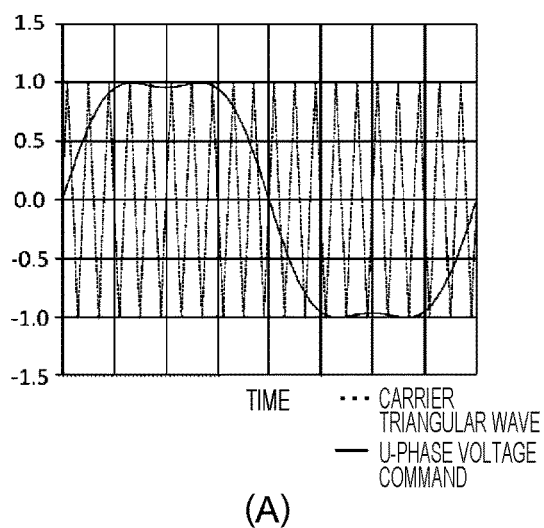
FIGS. 9(A), 9(B), 9(C), and 9(D) are diagrams illustrating a carrier triangular wave, a voltage command, and a line voltage between U and V phases.
Figure 9:
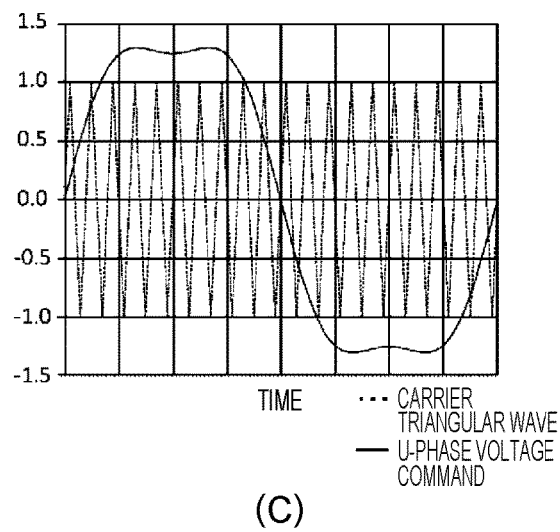
Figure 9:
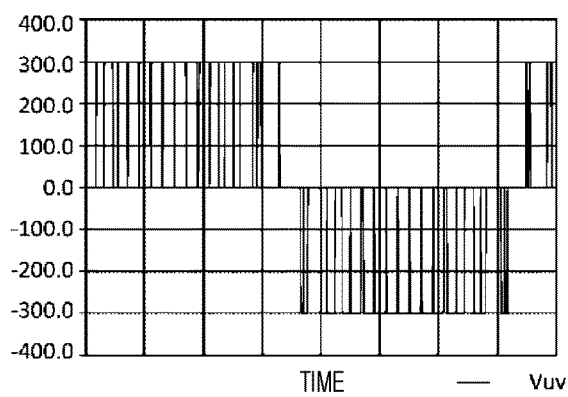
Figure 9:
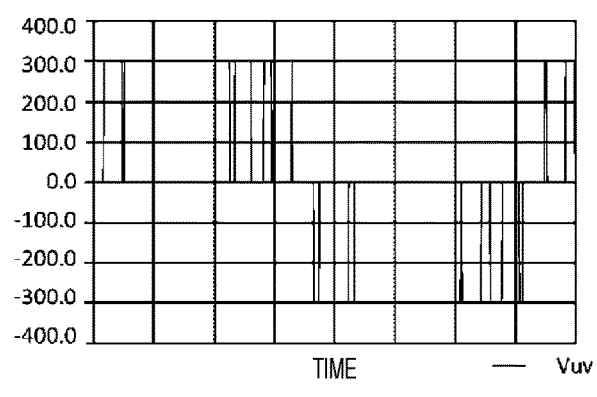

FIG. 8 is a block diagram of a triangular wave generation unit 17'. The triangular wave generation unit 17' includes a carrier frequency setting unit 171, a ratio calculation unit 172, a diffusion width generation unit 177, a random value generation unit 174, a random value integration unit 175, and a triangular wave signal generation unit 176. The diffusion width generation unit 177 of the triangular wave generation unit 17' has a configuration different from that of the triangular wave generation unit 17 in the first embodiment illustrated in FIG. 3, but other configurations are the same. Thus, the description thereof will be omitted. A configuration of the diffusion width generation unit 177 will be described later with reference to FIG. 15.

Although it has been described in the first embodiment that the DC voltage utilization factor obtained by dividing the effective value of the line voltage of each phase of the motor 2 by the DC voltage, that is, a ratio of the AC voltage to the DC voltage is equal to or less than 0.707 (modulation rate is equal to or less than 1.15). In the present embodiment, a case where the DC voltage utilization factor is greater than 0.707 (the modulation rate is greater than 1.15) is used as a target. The beat voltage and current in this case will be described below. In this case, the PWM signal is further reduced than that in the first embodiment.

FIG. 9(A) illustrates a triangular wave signal (dotted line in the figure) having a predetermined carrier frequency and a U-phase voltage command (solid line in the figure) when the DC voltage utilization factor is 0.707, and FIG. 9(B) illustrates a line voltage between the U and V phases when the voltage utilization factor is 0.707. FIG. 9(C) illustrates a triangular wave signal (dotted line in the figure) and a U-phase voltage command (solid line in the figure) when the DC voltage utilization factor is 0.748, and FIG. 9(D) illustrates a line voltage between the U and V phases when the DC voltage utilization factor is 0.748.

When the DC voltage utilization factor is 0.707, a pulse of the line voltage between the U and V phases does not disappear even near a peak of the U-phase voltage command as illustrated in FIGS. 9(A) and 9(B). However, when the DC voltage utilization factor is 0.748, a pulse of the line voltage between the U and V phases disappears near a peak of the U-phase voltage command as illustrated in FIGS. 9(C) and 9(D). There is square wave control as control for increasing the output by improving the DC voltage utilization factor, but there is a disadvantage that a load of the microcomputer increases by the square wave control.

The beat current differs depending on an update timing of the voltage command. Hereinafter, the update timing of the voltage command will be described.

Figure 10:
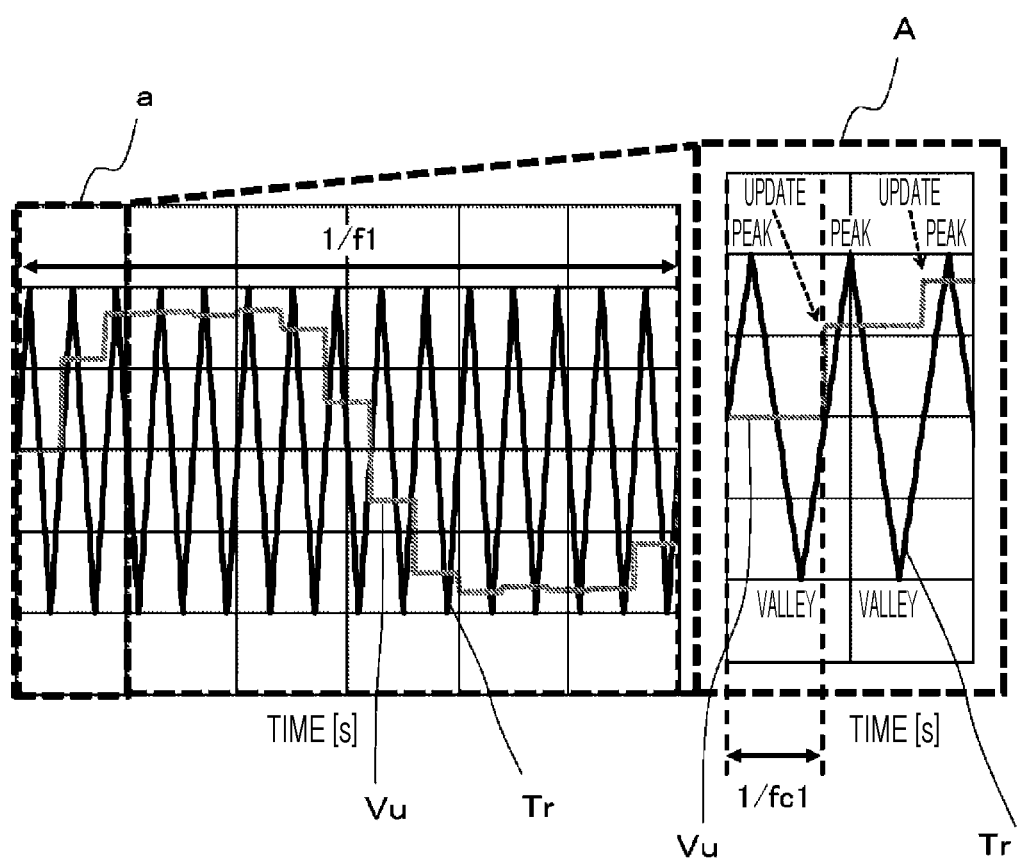
FIG. 10 is a diagram illustrating an update timing of a voltage command when an update cycle is $1/fc1$.

FIG. 10 is a diagram illustrating the voltage command Vu and the triangular wave signal Tr when an update cycle T1 of the voltage command Vu is 1/fc1. In FIG. 10, the figure of a part A is an enlarged view of the figure of a part a. In FIG. 10, the update timing of the voltage command Vu is one time (1/fc1) of one cycle (1/fc1) of the triangular wave signal Tr, and "peak side and valley side" of the triangular wave signal Tr continuously appear in one cycle of the triangular wave signal Tr which is the carrier signal. The control unit 1 updates the voltage command to the inverter 3 only on the peak side or the valley side of the carrier signal. Hereinafter, this is abbreviated as an update timing of "peak".

Figure 11:
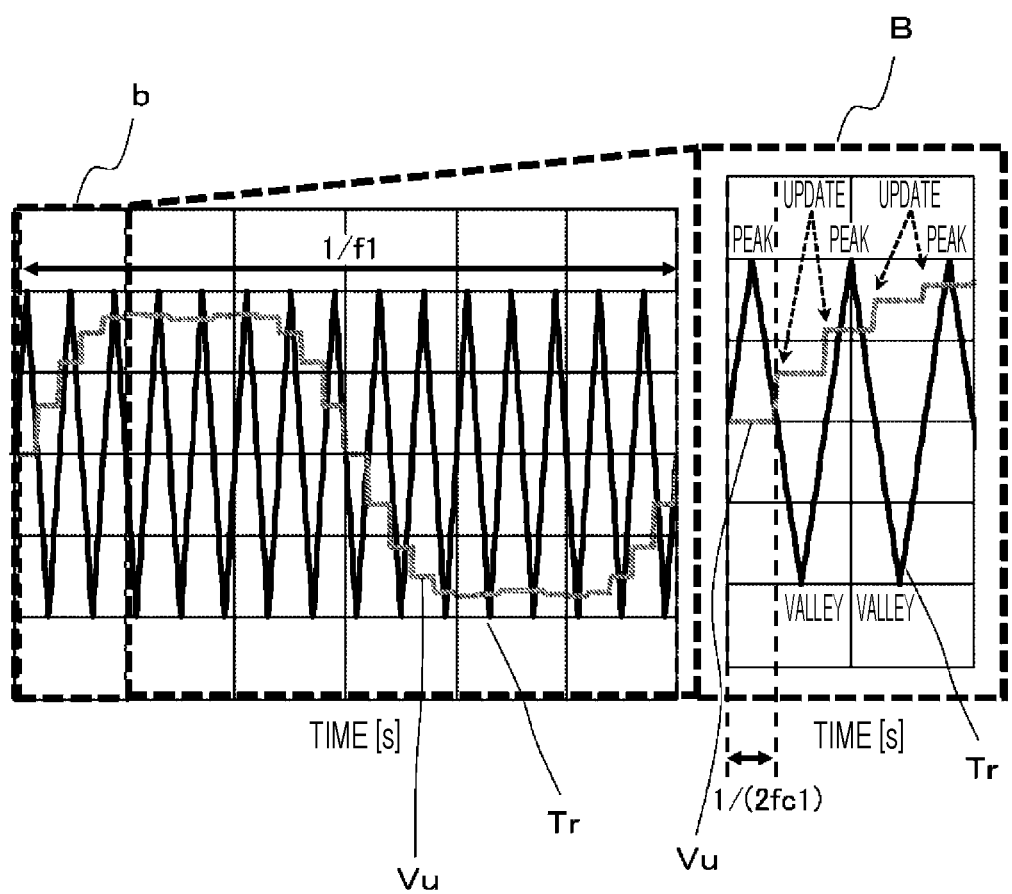
FIG. 11 is a diagram illustrating an update timing of a voltage command when an update cycle is $1/(2fc1)$.
Figure 12:
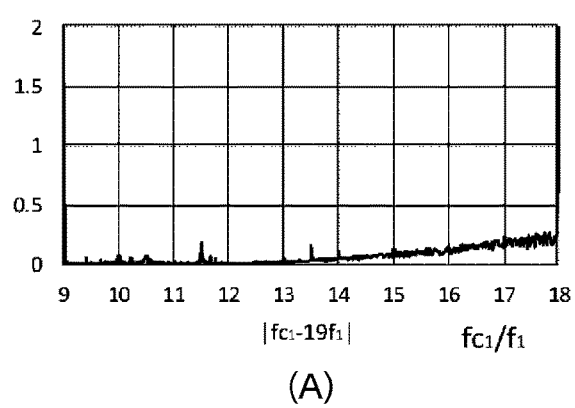
FIG. 12 is a diagram illustrating a relationship between $fc1/f1$ and a beat current around $fc1$ when a voltage command is updated at an update timing of "peak".
Figure 12:
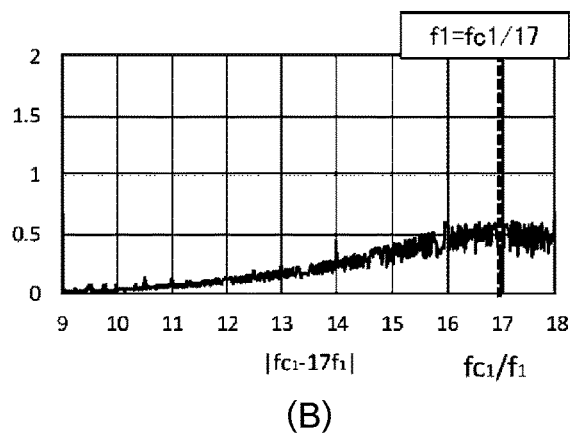
Figure 12:
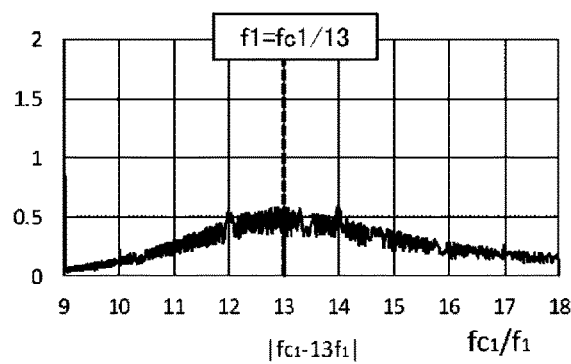
Figure 12:
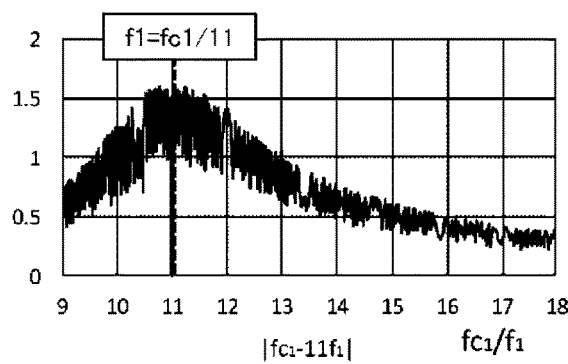
Figure 13:
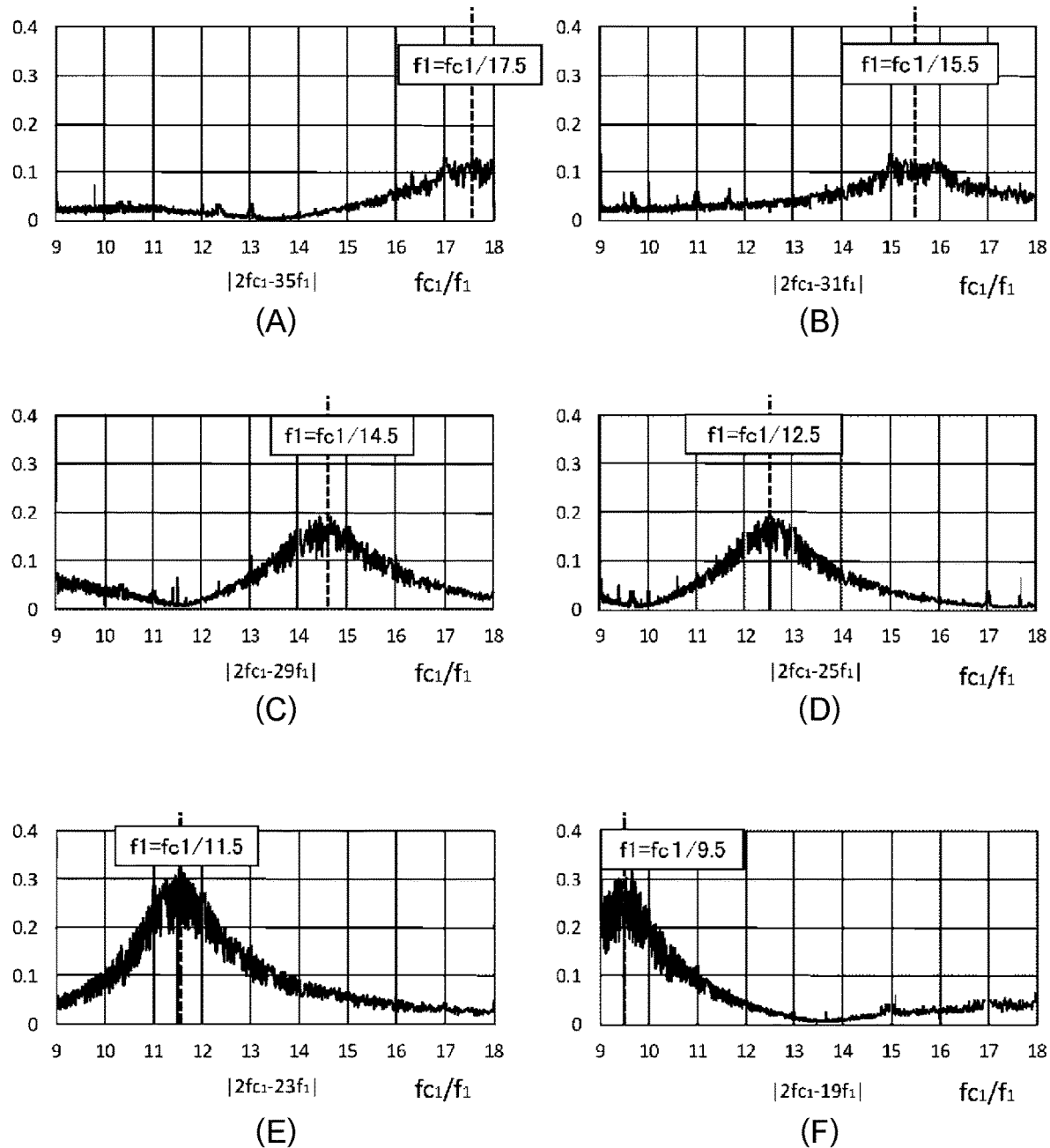
FIG. 13 is a diagram illustrating a relationship between $fc1/f1$ and a beat current around $2fc1$ when a voltage command is updated at an update timing of "peak".

FIG. 11 is a diagram illustrating the voltage command Vu and the triangular wave signal Tr when the update cycle T1 of the voltage command Vu is 1/(2fc1). In FIG. 11, the figure of a part B is an enlarged view of the figure of a part b. In FIG. 11, the update timing of the voltage command Vu is ½ of one cycle (1/fc1) of the triangular wave signal Tr, and the "peak side" and the "valley side" appear alternately in a ½ cycle of the triangular wave signal Tr which is the carrier signal. The control unit 1 updates the voltage command to the inverter 3 on both the peak side and the valley side of the carrier signal. Hereinafter, this is abbreviated as an update timing of "peak and valley".

FIGS. 12(A) to 12(D) are diagrams illustrating a relationship between fc1/f1 and the beat current around fc1 when the voltage command is updated at the update timing of "peak". In each figure, a horizontal axis represents fc1/f1 and a vertical axis represents the beat current. FIG. 12(A) is a graph in which the beat current at an absolute value of fc1−19f1 is measured. As fc1/f1 increases, the beat current also increases, and fc1/f1 increases at 18.5 and 19 although not illustrated. FIG. 12(B) is a graph in which the beat current at an absolute value of fc1−17f1 is measured. It can be seen that the beat current is maximized when fc1/f1 is 17. FIG. 12(C) is a graph in which the beat current at an absolute value of fc1−13f1 is measured. It can be seen that the beat current is maximized when fc1/f1 is 13. FIG. 12(D) is a graph in which the beat current at an absolute value of fc1−11f1 is measured. It can be seen that the beat current is maximized when fc1/f1 is 11.

FIGS. 13(A) to 13(F) are diagrams illustrating a relationship between fc1/f1 and the beat current around 2fc1 when the voltage command is updated at the update timing of the "peak". FIG. 13(A) is a graph in which the beat current at an absolute value of 2fc1−35f1 is measured. It can be seen that the beat current is maximized when fc1/f1 is 17.5. FIG. 13(B) is a graph in which the beat current at an absolute value of 2fc1−31f1 is measured. It can be seen that the beat current is maximized when fc1/f1 is 15.5. FIG. 13(C) is a graph in which the beat current at an absolute value of 2fc1−29f1 is measured. It can be seen that the beat current is maximized when fc1/f1 is 14.5. FIG. 13(D) is a graph in which the beat current at an absolute value of 2fc1−25f1 is measured. It can be seen that the beat current is maximized when fc1/f1 is 12.5. FIG. 13(E) is a graph in which the beat current at an absolute value of 2fc1−23f1 is measured. It can be seen that the beat current is maximized when fc1/f1 is 11.5. FIG. 13(F) is a graph in which the beat current at an absolute value of 2fc1−19f1 is measured. It can be seen that the beat current is maximized when fc1/f1 is 9.5. Although not illustrated, the beat current at an absolute value of 2fc1−17f1 is maximized when fc1/f1 is 8.5.

That is, it can be seen that the beat current is generated when fc1/f1 becomes any of 8.5, 9.5, 11, 11.5, 12.5, 13, 14.5, 15.5, 17, 17.5, 18.5, and 19 at the update timing of "peak".

Figure 14:
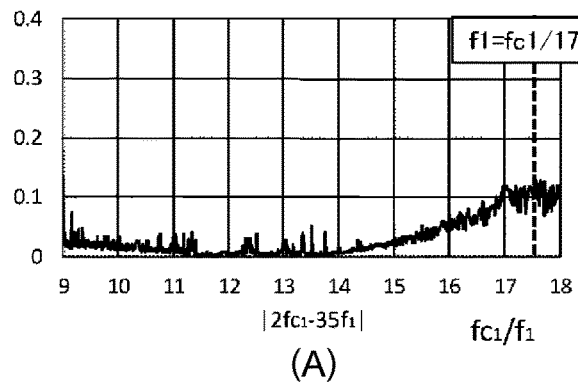
FIG. 14 is a diagram illustrating a relationship between $fc1/f1$ and a beat current around $2fc1$ when a voltage command is updated at an update timing of "peak and valley".
Figure 14:
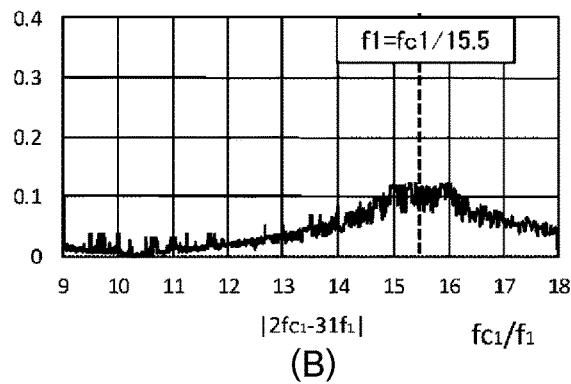
Figure 14:
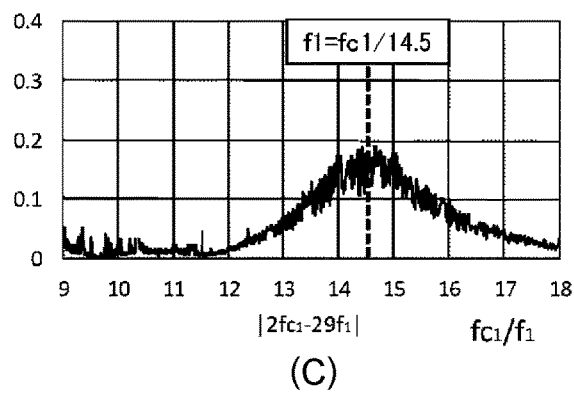
Figure 14:
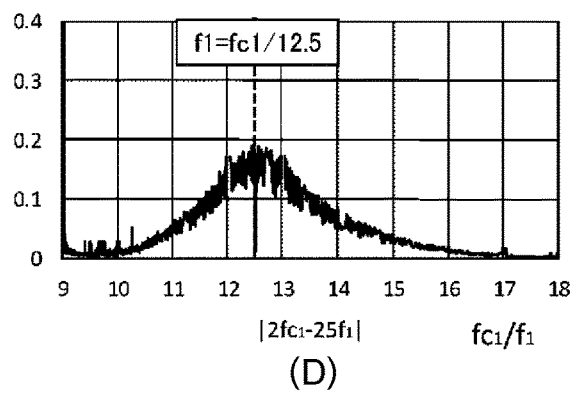
Figure 14:
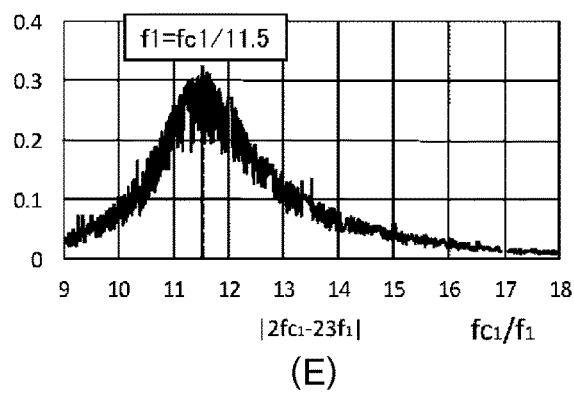
Figure 14:
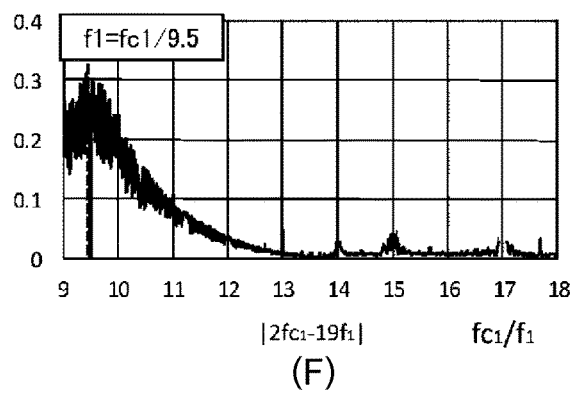

FIG. 14 is a diagram illustrating a relationship between fc1/f1 and the beat current around 2fc1 when the voltage command is updated at the update timing of "peak and valley". FIG. 14(A) is a graph in which the beat current at the absolute value of 2fc1−35f1 is measured. It can be seen that the beat current is maximized when fc1/f1 is 17.5. FIG. 14(B) is a graph in which the beat current at the absolute value of 2fc1−31f1 is measured. It can be seen that the beat current is maximized when fc1/f1 is 15.5. FIG. 14(C) is a graph in which the beat current at the absolute value of 2fc1−29f1 is measured. It can be seen that the beat current is maximized when fc1/f1 is 14.5. FIG. 14(D) is a graph in which the beat current at the absolute value of 2fc1−25f1 is measured. It can be seen that the beat current is maximized when fc1/f1 is 12.5. FIG. 14(E) is a graph in which the beat current at the absolute value of 2fc1−23f1 is measured. It can be seen that the beat current is maximized when fc1/f1 is 11.5. FIG. 14(F) is a graph in which the beat current at the absolute value of 2fc1−19f1 is measured. It can be seen that the beat current is maximized when fc1/f1 is 9.5. Although not illustrated, the beat current at the absolute value of 2fc1−17f1 is maximized when fc1/f1 is 8.5, and the beat current at the absolute value of 2fc1−37f1 is maximized when fc1/f1 is 18.5.

That is, it can be seen that the beat current is generated when fc1/f1 becomes any of 8.5, 9.5, 11.5, 12.5, 14.5, 15.5, 17.5, and 18.5 at the update timing of "peak and valley".

Thus, in the present embodiment, the diffusion width that randomly changes the carrier frequency fc1 is changed when the ratio of the carrier frequency fc1 and the electric angular frequency f1 of the motor is close to the predetermined first constant depending on the update timing of the voltage command.

Figure 15:
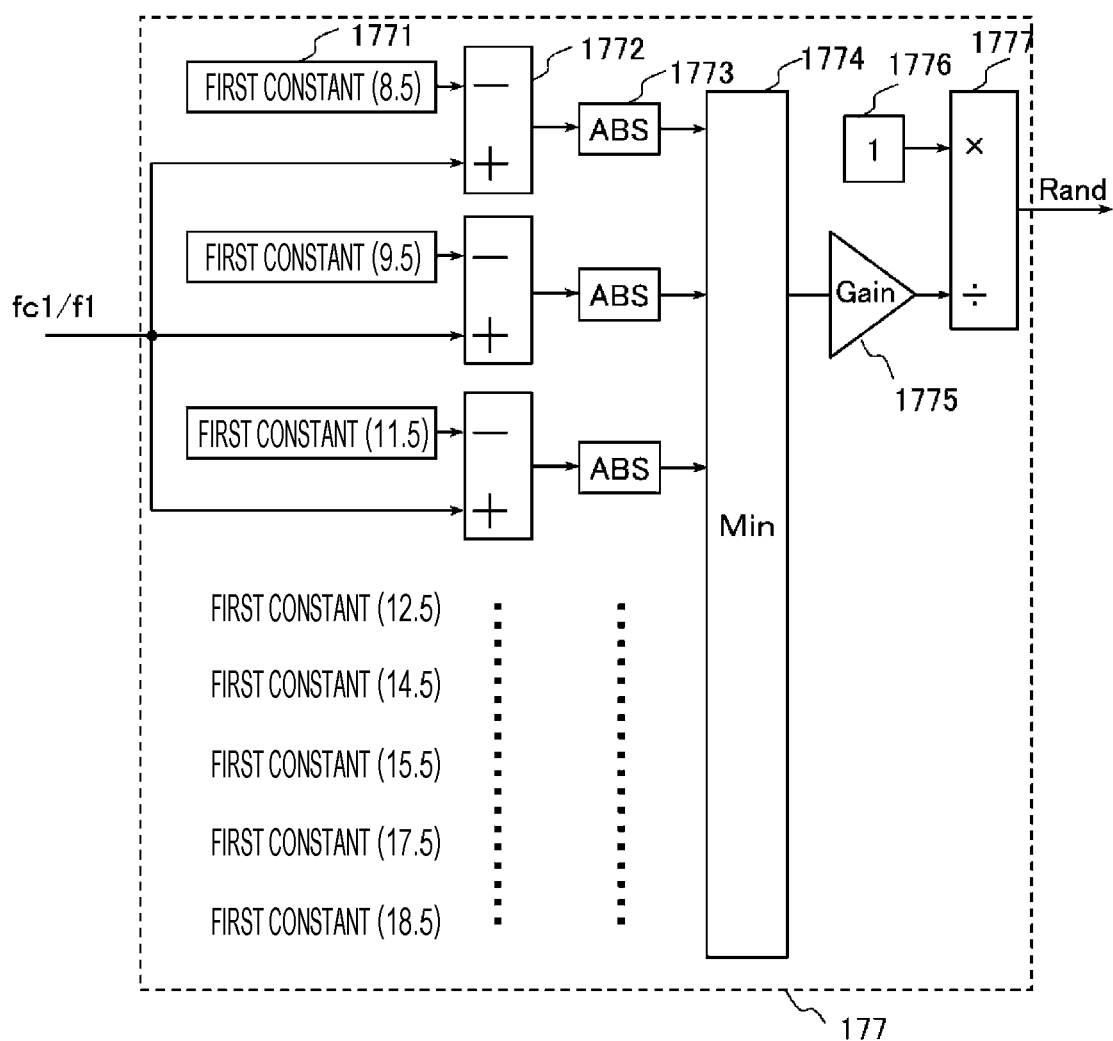
FIG. 15 is a configuration diagram of a diffusion width generation unit in the second embodiment.

FIG. 15 is a detailed configuration diagram of the diffusion width generation unit 177 in the present embodiment. The beat current when the voltage command is updated at the update timing of "peak and valley" is reduced based on this diffusion width generation unit 177.

As illustrated in FIG. 15, eight first constant storage units 1771 store eight constants 8.5, 9.5, 11.5, 12.5, 14.5, 15.5, 17.5, and 18.5 which are the first constants, respectively. Each of eight addition and subtraction units 1772 adds or subtracts each constant to or from the ratio of the first carrier frequency fc1 to the electric angular frequency f1 of the motor 2. The addition and subtraction results are input to a minimum value output unit 1774 via an absolute value output unit 1773. In FIG. 15, three first constant storage units 1771, three addition and subtraction units 1772, and three absolute value output units 1773 are illustrated, and the other five units are omitted.

The minimum value output unit 1774 outputs a value with the smallest difference between each constant and the ratio. This value is multiplied by a gain in a proportional unit 1775, and a reciprocal of 1 which is an output of a constant value output unit 1776 is used in a multiplication and division unit 1777. Accordingly, the diffusion width in inverse proportion to the absolute value of the difference between the first constant and the ratio of the first carrier frequency fc1 to the electric angular frequency f1 of the motor 2 is set. The gain of the proportional unit 1775 may be decided to reduce the beat current by numerical analysis, or may be decided such that a maximum effect can be obtained by experiment.

Hereinafter, referring back to FIG. 8, the random value generation unit 174 outputs the random value based on the random function or the random table. The random value integration unit 175 outputs the random value output from the random value generation unit 174 in the diffusion width Rand output from the diffusion width generation unit 177 by the product of the output of the random value generation unit 174 and the output of the diffusion width generation unit 177. The triangular wave signal generation unit 176 generates a triangular wave signal corresponding to a second carrier frequency fc2 which is obtained by adding the random value output from the random value integration unit 175 to the first carrier frequency fc1 which is the output of the carrier frequency setting unit 171.

In order to reduce the beat current when the voltage command is updated at the update timing of "peak", 12 first constant storage units 1771 store 12 constants 8.5, 9.5, 11, 11.5, 12.5, 13, 14.5, 15.5, 17, 17.5, 18.5, and 19 which are the first constants in FIG. 15, respectively. It is possible to reduce the beat current when the voltage command is updated at the update timing of "peak" based on this diffusion width generation unit 177.

When the rotation speed of the motor 2 is close to the frequency of the beat current and a resonance frequency with the mechanism such as the motor or the inverter, the diffusion width of the carrier frequency is further increased than the diffusion width illustrated in the present embodiment, and thus, the beat current may be reduced. That is, the control unit 1 increases the diffusion width when the absolute value of the frequency decided by the ratio of the carrier frequency fc1 to the electric angular frequency f1 of the motor is near the resonance frequency with the mechanism of the motor control device. By doing so, it is possible to provide a motor control device having low vibration and low noise in the entire speed range of the motor 2 while avoiding the resonance with the mechanism.

The motor control device 100 may be a motor drive system in which the motor 2 and the inverter 3 are integrated, or may be a system in which the motor 2 and the inverter 3 are separated.

Third Embodiment

Figure 16:
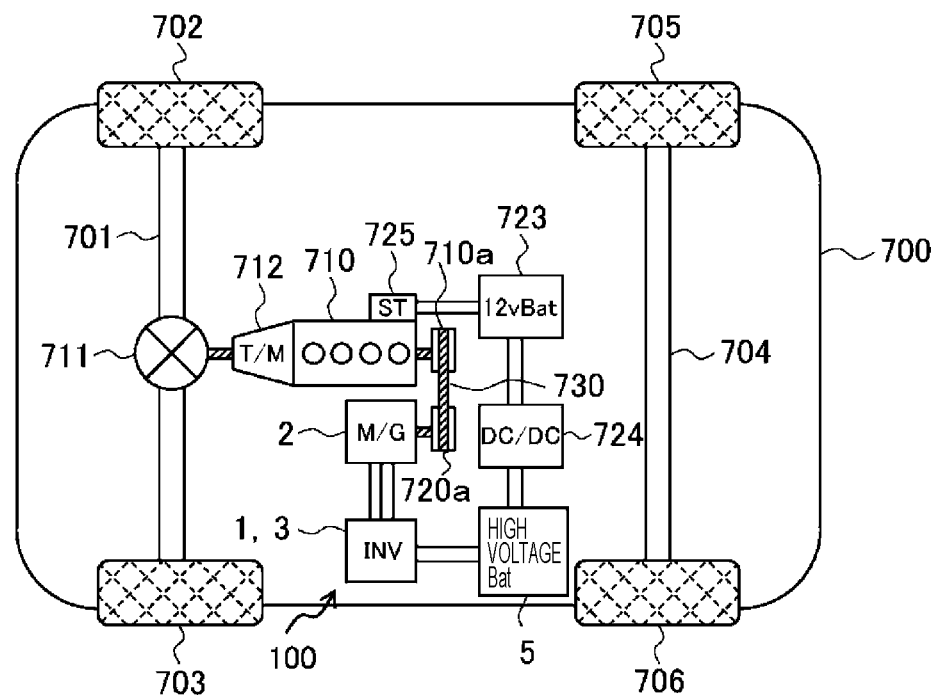
FIG. 16 is a diagram illustrating an electric vehicle system to which the motor control device is applied.

FIG. 16 is a diagram illustrating an electric vehicle system to which the motor control device 100 according to the first or second embodiment is applied. In FIG. 16, an example of a hybrid vehicle in which the motor 2 is applied as a motor or a generator will be described.

In the electric vehicle system illustrated in FIG. 16, the motor control device 100 is provided in a vehicle body 700. A front wheel axle 701 is rotatably supported at a front portion of the vehicle body 700, and front wheels 702 and 703 are provided at both ends of the front wheel axle 701. A rear wheel axle 704 is rotatably supported at a rear portion of the vehicle body 700, and rear wheels 705 and 706 are provided at both ends of the rear wheel axle 704.

A differential gear 711 which is a power distribution mechanism is provided at a center of the front wheel axle 701, and distributes a rotational driving force transmitted from an engine 710 via a transmission 712 to left and right front wheel axles 701.

The engine 710 and the motor 2 are mechanically coupled to a pulley 710a provided at a crankshaft of the engine 710 and a pulley 720a provided at a rotating shaft of the motor 2 via a belt 730.

Accordingly, a rotational driving force of the motor 2 is transmitted to the engine 710, and a rotational driving force of the engine 710 is transmitted to the motor 2. In the motor 2, a rotor is rotated by supplying three-phase AC power controlled by the control unit 1 and the inverter 3 to a stator coil of a stator, and rotational driving forces corresponding to the three-phase AC power are generated.

That is, the motor 2 operates as an electric motor under the control of the control unit 1 and the inverter 3, while the rotor rotates in response to the rotational driving force of the engine 710. Thus, an electromotive force is induced in the stator coil of the stator, and the motor operates as a generator that generates the three-phase AC power.

The inverter 3 is a power conversion device that converts the DC power supplied from the high voltage battery 5 which is a high-voltage (42 V or 300 V) power supply into the three-phase AC power, and controls the three-phase alternating currents flowing through the stator coil of the motor 2 corresponding to a magnetic pole position of the rotor according to an operation command value.

The three-phase AC power generated by the motor 2 is converted into the DC power by the inverter 3, and charges the high voltage battery 5. The high voltage battery 5 is electrically connected to a low voltage battery 723 via a DC-DC converter 724. The low voltage battery 723 constitutes a low-voltage (14 V) power supply for a vehicle, and is used as a power supply for a starter 725, a radio, a light, and the like that initially starts (cold starts) the engine 710.

The engine 710 is stopped when the vehicle is stopped (idle stop mode) such as waiting for a traffic light, and the inverter 3 drives the motor 2 and the engine 710 is restarted when the engine 710 is restarted (hot start) at the time of departure. In an idle stop mode, when the amount of charging of the high voltage battery 5 is insufficient or the engine 710 is not sufficiently warmed up, the engine 710 continues to be driven without being stopped. In the idle stop mode, it is necessary to secure a drive source for auxiliary machinery such as a compressor of an air conditioner that uses the engine 710 as a drive source. In this case, the motor 2 is driven to drive the auxiliary machinery.

Even in an acceleration mode or a high load operation mode, the motor 2 is driven to assist the driving of the engine 710. On the contrary, in a charging mode in which the charging of the high voltage battery 5 is required, the motor 2 generates the power by the engine 710, and the high voltage battery 5 is charged. That is, a regeneration mode is set at the time of braking or decelerating of the vehicle.

In the electric vehicle system using the motor control device 100 according to the first or second embodiment, it is possible to suppress the generation of the beat current while reducing a calculation load of the control unit (microcomputer). Thus, since the electromagnetic noise is reduced, it is possible to reduce the amount of vibration-proof material, sound-proof material, sound-insulating material, or the like attached to the vehicle body. The amount of such a material is reduced, and thus, it is possible to reduce a weight of the vehicle and it is possible to improve fuel efficiency.

Although it has been described in the present embodiment that the first or second motor control device 100 is applied to a hybrid vehicle, the same effect is obtained in an electric vehicle.

According to the above-described embodiments, the following advantageous effects are obtained.

(1) The motor control device 100 includes the inverter that converts the DC voltage into the three-phase AC voltage, and drives the motor 2, and the control unit 1 that outputs the PWM signal to the inverter 3 based on the carrier frequency. When the ratio of the preset first carrier frequency fc1 to the electric angular frequency f1 of the motor 2 is equal to or less than the first predetermined value, the control unit 1 randomly changes the carrier frequency around the first carrier frequency fc1. Accordingly, the beat current generated when the ratio of the carrier frequency to the electric angular frequency of the motor becomes small can be suppressed.

(2) The motor control device 100 includes the inverter that converts the DC voltage into the three-phase AC voltage, and drives the motor 2, and the control unit 1 that outputs the PWM signal to the inverter 3 based on the carrier frequency. When the ratio of the preset first carrier fc1 to the electric angular frequency f1 of the motor 2 is equal to or less than the first predetermined value and the ratio of the AC voltage to the DC voltage is equal to or greater than the second predetermined value, the control unit randomly changes the carrier frequency around the first carrier frequency. Accordingly, the beat current generated when the ratio of the carrier frequency to the electric angular frequency of the motor becomes small can be suppressed.

The present invention is not limited to the above-described embodiments, and other forms conceivable within the scope of the technical idea of the present invention are also included in the scope of the present invention as long as the characteristics of the present invention are not impaired.

REFERENCE SIGNS LIST 1 control unit
2 motor
3 inverter
4 rotation position sensor
5 high voltage battery
6 motor drive device
7 current detection circuit
11 current command generation unit
12 three-phase/dq conversion unit
13 current control unit
14 voltage command generation unit
15 gate signal generation unit
16 speed calculation unit
17 triangular wave generation unit
31 inverter circuit
32 PWM signal drive circuit
33 smoothing capacitor
41 rotation position detector
171 carrier frequency setting unit
172 ratio calculation unit
173,177 diffusion width generation unit
174 random value generation unit
175 random value integration unit
176 triangular wave signal generation unit
700 vehicle body 701 front wheel axle
702 front wheel
703 front wheel
704 rear wheel axle
705 rear wheel
706 rear wheel
710 engine
710a pulley
711 differential gear
712 transmission
720a pulley
723 low voltage battery
724 DC-DC converter
725 starter
730 belt
fr motor rotation frequency
f1 electric angular frequency
fc1 first carrier frequency
fc2 second carrier frequency
Rand diffusion width
Gup U-phase gate signal of upper arm
Gvp V-phase gate signal of upper arm
Gwp W-phase gate signal of upper arm
Gun U-phase gate signal of lower arm
Gvn V-phase gate signal of lower arm
Gwn W-phase gate signal of lower arm
Id d-axis current value
Idc current detection value
Id* d-axis current command
Iq q-axis current value
Iq* q-axis current command
Iu U-phase alternating current
Iv V-phase alternating current
Iw W-phase alternating current
Tr triangular wave signal
Rsh shunt resistor
T* torque command
VB DC voltage
Vd* d-axis voltage command
Vq* q-axis voltage command
Vu* U-phase voltage command value
Vv* V-phase voltage command value
Vw* W phase voltage command value
θ rotation position

The invention claimed is:

1. A motor control device, comprising:
an inverter that converts a DC voltage into a three-phase AC voltage, and drives a motor; and
a control unit that outputs a PWM signal to the inverter based on a carrier frequency,
wherein, when a ratio of a preset first carrier frequency to an electric angular frequency of the motor is equal to or less than a first predetermined value, the control unit randomly changes the carrier frequency around the first carrier frequency;
wherein, when the ratio of the first carrier frequency to the electric angular frequency of the motor is close to a predetermined first constant, the control unit changes a diffusion width with which the carrier frequency is randomly changed.

2. The motor control device according to claim 1, wherein the control unit sets the diffusion width in inverse proportion to an absolute value of a difference between the ratio of the first carrier frequency to the electric angular frequency of the motor and the first constant.

3. The motor control device according to claim 1, wherein the first constant is any of 3, 9, and 15.

4. The motor control device according to claim 1, wherein the first predetermined value is 20.

5. The motor control device according to claim 1, wherein the control unit randomly changes the carrier frequency based on a random function or a random table.

6. The motor control device according to claim 1, wherein the diffusion width is continuously changed according to the ratio of the first carrier frequency to the electric angular frequency of the motor.

7. An electric vehicle system, comprising:
the motor control device according to claim 1; and
the motor controlled to be driven by the motor control device.

8. A motor control device, comprising:
an inverter that converts a DC voltage into a three-phase AC voltage, and drives a motor; and
a control unit that outputs a PWM signal to the inverter based on a carrier frequency,
wherein, when a ratio of a preset first carrier frequency to an electric angular frequency of the motor is equal to or less than a first predetermined value and a ratio of the AC voltage to the DC voltage is equal to or greater than a second predetermined value, the control unit randomly changes the carrier frequency around the first carrier frequency.

9. The motor control device according to claim 8, wherein, when the ratio of the first carrier frequency to the electric angular frequency of the motor is close to a predetermined first constant which is equal to or less than the first predetermined value, the control unit changes a diffusion width with which the carrier frequency is randomly changed.

10. The motor control device according to claim 9, wherein the control unit updates a voltage command to the inverter only on a peak side or a valley side of a carrier signal having the carrier frequency.

11. The motor control device according to claim 10, wherein the predetermined first constant is any of 8.5, 9.5, 11, 11.5, 12.5, 13, 14.5, 15.5, 17, 17.5, 18.5, and 19.

12. The motor control device according to claim 9, wherein the control unit updates a voltage command to the inverter on both a peak side and a valley side of a carrier signal having the carrier frequency.

13. The motor control device according to claim 12, wherein the predetermined first constant is any of 8.5, 9.5, 11.5, 12.5, 14.5, 15.5, 17.5, and 18.5.

14. The motor control device according to claim 9, wherein the control unit sets the diffusion width in inverse proportion to an absolute value of a difference between the ratio of the first carrier frequency to the electric angular frequency of the motor and the first constant.

15. The motor control device according to claim 9, wherein the control unit increases the diffusion width when an absolute value of a frequency decided by the ratio of the first carrier frequency to the electric angular frequency of the motor is close to a resonance frequency with a mechanism of the motor control device.

16. The motor control device according to claim 8, wherein the first predetermined value is 20, and the second predetermined value is 0.707.

17. The motor control device according to claim 8, wherein the control unit randomly changes the carrier frequency based on a random function or a random table.

18. The motor control device according to claim 9, wherein the diffusion width is continuously changed according to the ratio of the first carrier frequency to the electric angular frequency of the motor.

* * * * *